United States Patent
Nasiri Khormuji et al.

(10) Patent No.: US 10,644,773 B2
(45) Date of Patent: May 5, 2020

(54) FEEDBACK CHANNEL INFORMATION USING PRE-CODERS IN A WIRELESS COMMUNICATION SYSTEM

(71) Applicant: Huawei Technologies Co., Ltd., Shenzhen (CN)

(72) Inventors: Majid Nasiri Khormuji, Kista (SE); Renaud-Alexandre Pitaval, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/040,872

(22) Filed: Jul. 20, 2018

(65) Prior Publication Data

US 2018/0337717 A1   Nov. 22, 2018

Related U.S. Application Data

(63) Continuation of application No. PCT/EP2016/051175, filed on Jan. 21, 2016.

(51) Int. Cl.
*H04W 4/00* (2018.01)
*H04B 7/0456* (2017.01)
(Continued)

(52) U.S. Cl.
CPC ......... *H04B 7/0486* (2013.01); *H04B 7/0417* (2013.01); *H04B 7/0421* (2013.01);
(Continued)

(58) Field of Classification Search
CPC ..... H04B 7/0486; H04B 7/0639; H04L 5/005; H04L 5/14
See application file for complete search history.

(56) References Cited

U.S. PATENT DOCUMENTS

2012/0201282 A1* 8/2012 Li ................... H04B 7/0417
                                                      375/219
2014/0093005 A1   4/2014 Xia et al.
(Continued)

FOREIGN PATENT DOCUMENTS

CN  103929227 A   7/2014
WO  2011150549 A1  12/2011
(Continued)

OTHER PUBLICATIONS

Sayeed "Deconstructing Multiantenna Fading Channels",IEEE Transactions on Signal Processing, vol. 50, No. 10, Institute of Electrical and Electronics Engineers, New York, New York (Oct. 2002).
(Continued)

*Primary Examiner* — Abdelnabi O Musa
(74) *Attorney, Agent, or Firm* — Leydig, Voit & Mayer, Ltd.

(57) ABSTRACT

The disclosure relates to a first communication device for a wireless communication system, the first communication device comprising: a processor, a cascade precoder including an outer precoder and an inner precoder, and a transceiver; wherein the processor is configured to determine the inner precoder; wherein the transceiver is configured to transmit a first pilot sequence to a second communication device; wherein the transceiver is configured to receive a first channel estimation from the second communication device; wherein the processor is configured to determine the outer precoder based on the first channel estimation; wherein the transceiver is configured to transmit at least one of a data sequence and a pilot sequence to the second communication device.

17 Claims, 10 Drawing Sheets

(51) Int. Cl.
*H04B 7/06* (2006.01)
*H04B 7/0417* (2017.01)
*H04L 5/00* (2006.01)
*H04L 5/14* (2006.01)

(52) U.S. Cl.
CPC ............ *H04B 7/061* (2013.01); *H04B 7/063* (2013.01); *H04B 7/065* (2013.01); *H04B 7/0619* (2013.01); *H04B 7/0639* (2013.01); *H04B 7/0673* (2013.01); *H04L 5/005* (2013.01); *H04L 5/14* (2013.01)

(56) References Cited

U.S. PATENT DOCUMENTS

| | | | | |
|---|---|---|---|---|
| 2014/0177545 | A1* | 6/2014 | Nammi | H04W 72/1226 |
| | | | | 370/329 |
| 2015/0030092 | A1* | 1/2015 | Krishnamurthy | H04B 7/0456 |
| | | | | 375/267 |
| 2015/0349864 | A1* | 12/2015 | Kim | H04J 11/00 |
| | | | | 375/299 |
| 2016/0337056 | A1* | 11/2016 | Frenne | H04B 7/0695 |

FOREIGN PATENT DOCUMENTS

| | | |
|---|---|---|
| WO | 2011162422 A1 | 12/2011 |
| WO | 2015088419 A1 | 6/2015 |

OTHER PUBLICATIONS

Marzetta "Noncooperative Cellular Wireless with Unlimited Numbers of Base Station Antennas",IEEE Transactions on Wireless Communications, vol. 9, No. 11, Institute of Electrical and Electronics Engineers, New York, New York (Nov. 2010).

Hugl et al.,"Spatial Reciprocity of Uplink and Downlink Radio Channels in FDD Systems",Nokia Research Center, Helsinki, Finland, (May 30-31, 2002).

* cited by examiner

FEEDBACK CHANNEL INFORMATION USING PRE-CODERS IN A WIRELESS COMMUNICATION SYSTEM

CROSS-REFERENCE TO RELATED APPLICATIONS

This application is a continuation of International Application No. PCT/EP2016/051175, filed on Jan. 21, 2016, the disclosure of which is hereby incorporated by reference in its entirety.

TECHNICAL FIELD

The disclosure relates to a communication device for a wireless communication system. Furthermore, the disclosure also relates to corresponding methods, a wireless communication system, a computer program, and a computer program product.

BACKGROUND

Future wireless communication systems are expected to provide a concurrent connection of multiple data streams to the users. A massive Multiple Input Multiple Output (mMIMO) access node (e.g. a network node, such as a base station (BS)) can be used to provide multiple streams of data to a single user (such as a User Equipment (UE)), which is equipped with multiple antennas. To enable mMIMO communications, the spatial radio channels should be acquired. To learn the radio channels in the timefrequency grid in the Time Division Duplex (TDD) mode for mMIMO communication with a user with $n_r$ antennas, $n_r$ orthogonal pilot symbols, each associated to an antenna of the user, are required over a timefrequency grid of the size $T_c \times B_c$ regardless of number of antennas of the access node, where $T_c$ is the coherence time of the channel and $B_c$ is the coherence bandwidth of the channel. This is a reason that TDD is an appealing solution for mMIMO. However, the conventional TDD solution cannot be applied for Frequency Division Duplex (FDD) downlink transmission as crystallized by the following three issues.

Conventional long term evolution (LTE) solution for FDD does not work for FDD mMIMO where for example the massive antenna array contains hundreds of antennas. To illustrate this, for simplicity we assume that channel between the transmitter and receiver are unknown constants. To learn the channel (e.g., the equivalent complex number affecting the narrowband transmitted signals), at least one linear equation per number of unknowns is needed to find a meaningful estimation of the channel in general, and in particular when the antenna spacing is configured such that it results in a full rank channel matrix. So to learn for example a downlink channel from a base station with $n_t$ antennas to a user each with $n_r$ antennas, at least $n_t$ pilot signals are needed; i.e. one pilot per antenna, or alternatively $n_r$ orthogonal sequences of length $n_t$ (or spanning a subspace with dimension $n_t$) are required. For uplink transmission, however the required number of pilot symbols changes to $n_r$.

The density of pilot symbols depends on the radio channel characteristic which changes over time and frequency. However, the variations in time depend on the mobility of the users (e.g. mobile users). The faster the users move, the faster the channel in time changes due to a larger Doppler frequency. The radio channel can be assumed unchanged within the coherence time $T_c$, which is a function of the carrier frequency and the velocity of the user. So to learn the channel between transmit and receive antenna ports over a coherence time, at least one pilot symbol per coherence time is needed. Similarly, the radio channel varies in frequency. However, the changes in the frequency are generally characterized by the coherence bandwidth, $B_c$ which depends on the delay profile of the channel and the symbol duration. So via the conventional pilot transmission, one can see that the number of pilot symbols increases linearly with the number of antennas and hence it does not scale favorably for massive antenna arrays.

Assume hypothetically that the users have found the channels. Then there will be $n_t$ coefficients per antenna port at the user, which are needed to be fed back to the base station. The conventional feedback of these coefficients results in a high overhead and is not scalable with the number of transmit antennas.

Having learned the channels and transmitted feedback, then it is essential to find precoding strategies that enable concurrent multi-stream transmission over shared time frequency resources. Finding the precoder is tightly connected to the spatial channel estimation.

In a conventional method for multi-stream downlink transmission for FDD MIMO links the transmitter is configured to coordinate transmission of pilot sequences in a coherence interval over a subset of antenna ports to the user; and to receive precoding matrix index (PMI) and rank indication (RI) via which to further configure the transmission of the plurality of jointly spatially precoded symbol sequences of the said users. In LTE and LTE Advanced, this precoding strategy is standardized. However, this solution requires channel training over each antenna port and the conventional channel training cannot be extended to mMIMO due to very high pilot and feedback transmission overhead.

To reduce uplink overhead for 8 Tx MIMO, LTE includes a double codebook structure, i.e. a cascade precoder, targeting closely spaced antennas implying spatial correlation. The first feedback link tracks long-term/wideband channel fluctuation while the second feedback channel carries short-term/sub-band channel state information (CSI). To reduce the feedback in mMIMO, there is also a similar two-stage precoding where one stage is updated less often and hence requires less feedback.

Nevertheless, this solution also suffers from the overhead in pilot transmission to learn the channels at the user side. The conventional solutions further require that the transmitter send a large amount of pilot symbols from the mMIMO base stations which scales linearly with number of antennas using the classical solutions as those practiced in LTE systems. Further, the conventional solutions require that the user searches for an appropriate precoding matrix. Since precoding codebook for large antennas need to be large enough to be enabling the gain of mMIMO arrays. This increases the battery consumption and complexity of the user for mMIMO systems. Under assumption that the user performs the correct channel estimation, it requires the feedback which consumes radio time-frequency resource, which could be otherwise used for UL data transmission for higher performance.

SUMMARY

An objective of embodiments of the disclosure is to provide a solution which mitigates or solves the drawbacks and problems of conventional solutions.

Another objective of this disclosure is to alleviate the need of excessive channel training and feedback overhead for precoding of wireless communication system employing cascade precoders comprising an outer precoder and an inner precoder.

The above objectives and further objectives are achieved by the subject matter of the independent claims. Further advantageous implementation forms of the disclosure are defined by the dependent claims.

According to a first aspect of the disclosure, the above mentioned and other objectives are achieved with a first communication device for a wireless communication system, the first communication device comprising:

a processor, a cascade precoder including an outer precoder and an inner precoder, and a transceiver;

wherein the processor is configured to determine the inner precoder;

wherein the transceiver is configured to transmit a first pilot sequence to a second communication device, the first pilot sequence being precoded with the determined inner precoder by the processor;

wherein the transceiver is configured to receive a first channel estimation from the second communication device in response to the transmission of the first pilot sequence;

wherein the processor is configured to determine the outer precoder based on the first channel estimation;

wherein the transceiver is configured to transmit at least one of a data sequence and a pilot sequence to the second communication device.

A number of advantages are provided by a wireless communication system according to the first aspect. The overhead in the transmissions from the first communication device to the second communication device is reduced since the number of pilot symbols (of the pilot sequences) transmitted from the first communication device to the second communication device is reduced, which is proportional to the number of output symbols of the outer precoder. Also feedback overhead is reduced by removing the feedback for the inner precoder from the second communication device. Further, dimension reduction of the equivalent inner precoded channel, which has smaller dimension compared to the number of antennas, also reduces the feedback overhead. Moreover, the outer precoder provides an enhanced channel adaption as compared to the case when there is only the inner precoder.

In a first possible implementation form of a first communication device according to the first aspect, the at least one data sequence and pilot sequence is precoded with the determined outer precoder and the determined inner precoder by the processor.

Pilot transmissions which are precoded by both the determined inner precoder and the determined outer precoder aid the second communication device to estimate the outer-inner-precoded-channel. The second communication device might not be aware of the choice of the precoders at the first communication device and hence the pilot transmissions becomes crucial for the estimation of the equivalent outer-inner-precoded channel.

In a second possible implementation form of a first communication device according to the first implementation form of the first aspect or to the first aspect as such, the first channel estimation is associated with a first radio channel from the first communication device to the second communication device.

In a third possible implementation form of a first communication device according to the second implementation form of the first aspect, the transceiver is configured to receive at least one of a data sequence and a second pilot sequence from the second communication device; wherein the processor is configured to compute a second channel estimation associated with a second radio channel from the second communication device to the first communication device based on the at least one data sequence and second pilot sequence and to determine the inner precoder based on the second channel estimation.

This provides a way to choose the inner precoder based on the second channel estimation without feedback. For example, in FDD mMIMO, there is no full channel reciprocity as opposed to TDD mMIMO systems. However as discussed in the following detailed description there exist some "partial reciprocity" which could be used for the inner precoded. Hence, the second channel estimation becomes useful for determining the inner precoder.

In a fourth possible implementation form of a first communication device according to the third implementation form of the first aspect, the processor is configured to compute the correlation matrix for the second radio channel based on the second channel estimation and to determine the inner precoder based on the correlation matrix for the second radio channel.

The correlation matrix for the second radio channel generally shows reciprocity in FDD as well. Therefore, this implementation form uses the correlation matrix of the second radio channel to determine the inner precoder. Hence the inner precoder provides long-term channel adaptation resulting in improved performance.

In a fifth possible implementation form of a first communication device according to the fourth implementation form of the first aspect, the processor is configured to compute the correlation matrix for the first radio channel based on the correlation matrix for the second radio channel, and to determine the inner precoder based on the correlation matrix for the first radio channel.

This implementation form is similar to the previous one. However, the processor transforms the correlation matrix of the second radio channel to the correlation matrix of the first radio channel prior to the determination of the inner precoder.

In a sixth possible implementation form of a first communication device according to any of the third to the fifth implementation forms of the first aspect, the processor is configured to estimate the angles-of-arrivals of the at least one data sequence and second pilot sequence, to compute the correlation matrix for the first radio channel based on the estimated angles-of-arrivals of the at least one data sequence and second pilot sequence, and to determine the inner precoder based on the correlation matrix for the first radio channel.

This implementation form suggests a way to form the correlation matrix to be used for the inner-precoder. Normally, the angles-of-arrivals also show some reciprocity in FDD as well. Hence, information about the angles-of-arrivals can also be used for compute the correlation matrix for the first radio channel so as to determine the inner precoder.

In a seventh possible implementation form of a first communication device according to the sixth implementation form of the first aspect, the angles-of-arrivals are at least one of inclination angles and azimuth angles.

In an eight possible implementation form of a first communication device according to any of the fifth to the seventh implementation forms of the first aspect, the processor is configured to perform a Singular Value Decomposition, SVD, of the correlation matrix for the first radio channel, and to determine the inner precoder based on the SVD.

This implementation form suggests how one could form the inner precoder from the correlation matrix using SVD. By SVD, one could order and choose the strongest transmission beams toward the second communication device and also have a control on the dimension of the inner precoder which affects the number of pilot transmissions to the second communication device as well as the feedback overhead.

In a ninth possible implementation form of a first communication device according to the eight implementation form of the first aspect, the processor is configured to determine the inner precoder based on a subset of the most dominant eigenvectors of the SVD.

By choosing the strongest transmission beams, i.e. the most dominant eigenvectors, toward the second communication device one can provide better channel gains as well as the processor has control on the dimension of the inner precoder which affects the size of pilot transmissions to the second communication channel as well as the feedback overhead for the outer precoder.

In a tenth possible implementation form of a first communication device according to any of the preceding implementation forms of the first aspect, the transceiver is configured to receive an outer precoding indicator from the second communication device; and wherein the processor is configured to determine the outer precoder according to the outer precoding indicator.

This implementation form provides a feedback mechanism for determining the outer precoder.

In an eleventh possible implementation form of a first communication device according to the tenth implementation form of the first aspect, the outer precoding indicator is a Precoding Matrix Index, PMI, or a Rank Indication, RI.

In a twelfth possible implementation form of a first communication device according to any of the preceding implementation forms of the first aspect, the number of output streams $n_b$ of the outer precoder is less than the number of transmit antennas $n_t$ of the first communication device.

This provide the means for mMIMO since the first communication device cannot afford to transmit pilot sequences using conventional strategies due to large overhead which results in a huge loss of spectral efficiency of the wireless communication system. A further advantage is the reduction of feedback since the equivalent channel has smaller dimension.

In a thirteenth possible implementation form of a first communication device according to any of the preceding implementation forms of the first aspect, the processor is configured to use a metric function for determining the inner precoder.

The metric function may relate to capacity, Signal-to-Noise Ratio (SNR), Signal-to-Interference plus Noise-Ratio (SINR), matrix correlation, inverse distance, etc.

In a fourteenth possible implementation form of a first communication device according to any of the preceding implementation forms of the first aspect, the processor is configured to determine the inner precoder from Discrete Fourier Transform, DFT, codebooks.

According to a second aspect of the disclosure, the above mentioned and other objectives are achieved with a method for a first communication device comprising a cascade precoder including an outer precoder and an inner precoder, the method comprising:

determining the inner precoder;

transmitting a first pilot sequence to a second communication device, the first pilot sequence being precoded with the determined inner precoder;

receiving a first channel estimation from the second communication device in response to the transmission of the first pilot sequence;

determining the outer precoder based on the first channel estimation;

transmitting at least one of a data sequence and a pilot sequence to the second communication device.

In a first possible implementation form of a method according to the second aspect, the at least one data sequence and pilot sequence is precoded with the determined outer precoder and the determined inner precoder by the processor.

In a second possible implementation form of a method according to the first implementation form of the second aspect or to the second aspect as such, the first channel estimation is associated with a first radio channel from the first communication device to the second communication device.

In a third possible implementation form of a method according to the second implementation form of the second aspect, the method further comprises receiving at least one of a data sequence and a second pilot sequence from the second communication device, computing a second channel estimation associated with a second radio channel from the second communication device to the first communication device based on the at least one data sequence and second pilot sequence, and to determining the inner precoder based on the second channel estimation.

In a fourth possible implementation form of a method according to the third implementation form of the second aspect, the method further comprises computing the correlation matrix for the second radio channel based on the second channel estimation and determining the inner precoder based on the correlation matrix for the second radio channel.

In a fifth possible implementation form of a method according to the fourth implementation form of the second aspect, the method further comprises computing the correlation matrix for the first radio channel based on the correlation matrix for the second radio channel, and determining the inner precoder based on the correlation matrix for the first radio channel.

In a sixth possible implementation form of a method according to any of the third to the fifth implementation forms of the second aspect, the method further comprises estimating the angles-of-arrivals of the at least one data sequence and second pilot sequence, computing the correlation matrix for the first radio channel based on the estimated angles-of-arrivals of the at least one data sequence and second pilot sequence, and determining the inner precoder based on the correlation matrix for the first radio channel.

In a seventh possible implementation form of a first communication device according to the sixth implementation form of the second aspect, the angles-of-arrivals are at least one of inclination angles and azimuth angles.

In an eight possible implementation form of a method according to any of the fifth to the seventh implementation forms of the second aspect, the method further comprises performing a Singular Value Decomposition, SVD, of the correlation matrix for the first radio channel, and determining the inner precoder based on the SVD.

In a ninth possible implementation form of a method according to the eight implementation form of the second aspect, the method further comprises determining the inner precoder based on a subset of the most dominant eigenvectors of the SVD.

In a tenth possible implementation form of a method according to any of the preceding implementation forms of the second aspect or to the second aspect as such, the method further comprises receiving an outer precoding indicator from the second communication device, and determining the outer precoder according to the outer precoding indicator.

In an eleventh possible implementation form of a method according to the tenth implementation form of the second aspect, the outer precoding indicator is a Precoding Matrix Index, PMI, or a Rank Indication, RI.

In a twelfth possible implementation form of a method according to any of the preceding implementation forms of the second aspect or to the second aspect as such, the number of output streams $n_b$ of the outer precoder is less than the number of transmit antennas $n_t$ of the first communication device.

In a thirteenth possible implementation form of a method according to any of the preceding implementation forms of the second aspect or to the second aspect as such, the method further comprises using a metric function for determining the inner precoder.

In a fourteenth possible implementation form of a method according to any of the preceding implementation forms of the second aspect or to the second aspect as such, the method further comprises determining the inner precoder from Discrete Fourier Transform, DFT, codebooks.

The advantages of the methods according to second aspect are the same as the corresponding first communication device according to the first aspect.

According to a third aspect of the disclosure, the above mentioned and other objectives are achieved with a wireless communication system comprising at least one first communication device according to any of the preceding claims and at least one second communication device, wherein the first communication device is an access network node, such as a base station or an access point, and the second communication device is a user device, such as a UE or a network node including a relay node.

Embodiments of the disclosure also relates to a computer program, characterized in code means, which when run by processing means causes said processing means to execute any method according to the disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the disclosure will be apparent from the following detailed description.

BRIEF DESCRIPTION OF THE DRAWINGS

The appended drawings are intended to clarify and explain different embodiments of the disclosure, in which.

DETAILED DESCRIPITON

Figure 1:
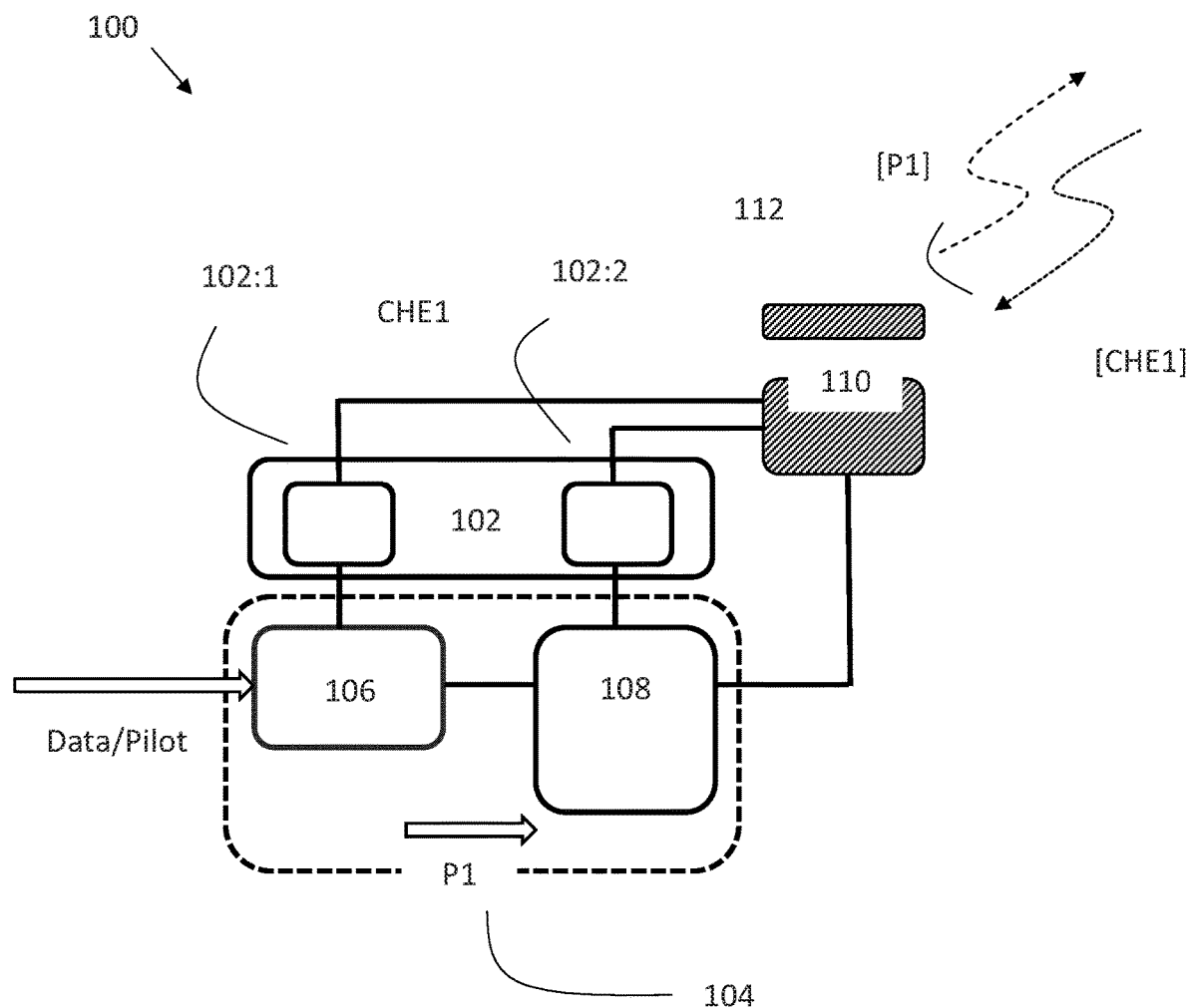
FIG. 1 shows a first communication device according to an embodiment of the disclosure.

FIG. 1 shows a first communication device 100 according to an embodiment of the disclosure. The first communication device 100 comprises a processor 102 which is communicably coupled to a transceiver 110 and a cascade precoder 104. The transceiver 110 is configured for wireless transmissions and receptions of data. The transceiver 110 is in this example coupled to an antenna device 112 having a plurality of physical antennas or antenna ports $n_t$. The number of antenna ports are less than or equal to the number of physical antennas. The present cascade precoder 104 comprises of an outer precoder 106 coupled in cascade with an inner precoder 108. The present cascade precoder 104 is controlled by the processor 102.

The present processor 102 comprises in this example of two modules, i.e. a first module 102:1 is configured to control the outer precoder 106 and a second module 102:2 is configured to control the inner precoder 108. The first 102:1 and second 102:2 modules may be software implemented, hardware implemented or combinations thereof. The processor 102 is according to the present solution configured to determine the inner precoder 108. The transceiver 110 is configured to transmit a first pilot sequence P1 to a second communication device 300 (see FIG. 3), where the first pilot sequence P1 is precoded with the determined inner precoder 108 by the processor 102 as illustrated in FIG. 1 in which the first pilot sequence P1 goes directly into the inner precoder 108. The transmission of the first pilot sequence P1 to the second communication device is illustrated with the dashed arrow in FIG. 1. The transceiver 110 is further configured to receive a first channel estimation CHE1 from the second communication device 300 in response to the transmission of the first pilot sequence P1. This reception is illustrated with the dotted arrow in FIG. 1. It is also illustrated in FIG. 1 how the first module 102:1 receives the first channel estimation CHE1. The processor 102 is further configured to determine the outer precoder 106 based on the first channel estimation CHE1 received from the second communication device 300. Finally, the transceiver 110 is configured to transmit at least one of a data sequence and a pilot sequence (illustrated with the "Data/Pilot" arrow) to the second communication device 300. The data and/or pilot sequences for transmission are received by the cascade precoder 104.

Figure 2:
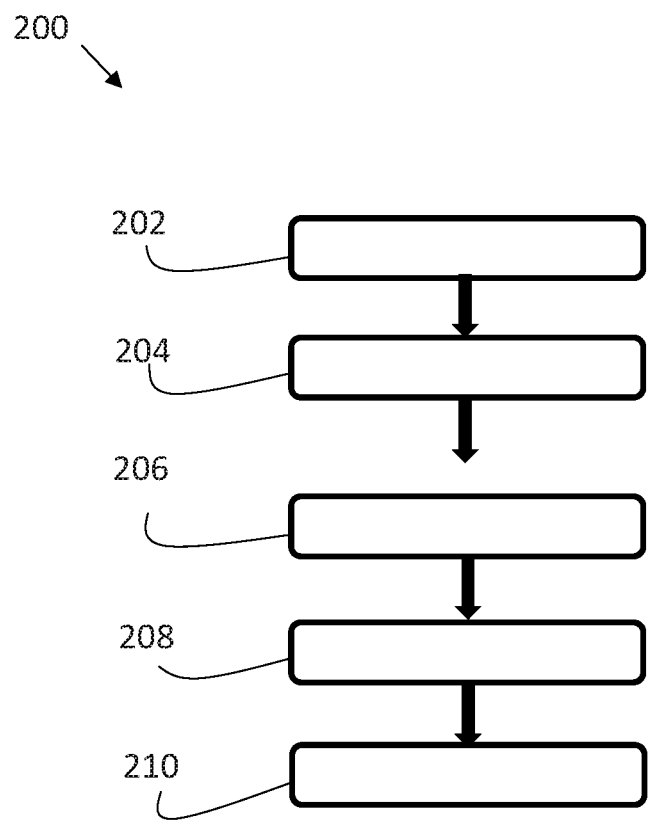
FIG. 2 shows a method according to an embodiment of the disclosure.

FIG. 2 shows a corresponding method 200 which may be implemented in a first communication device, such as the one shown in FIG. 1. The method 200 comprises the step of determining 202 the inner precoder 108. The method 200 further comprises the step of transmitting 204 a first pilot sequence P1 to a second communication device 300, wherein the first pilot sequence P1 is precoded with the determined inner precoder 108. The method 200 further comprises the step of receiving 206 a first channel estimation CHE1 from the second communication device 300 in response to the transmission of the first pilot sequence P1. The method 200 further comprises the step of determining 208 the outer precoder 106 based on the first channel estimation CHE1. The method 200 finally comprises the step of transmitting 210 at least one of a data sequence and a pilot sequence to the second communication device 300.

In the following disclosure further embodiments of the disclosure are described in mainly 3GPP context with its terminology. However, embodiments of the disclosure are not limited to 3GPP communication systems, such as LTE and LTE Advanced. In many of the disclosed examples the first communication device 100 is a BS (or more generally a network node); whilst the second communication device 300 is a UE (or more generally a user device). However, the reverse case is possible, i.e. the first communication device 100 is a UE and the second communication device 300 is a BS.

A (radio) network node or an access node or an access point or a base station, e.g., a Radio Base Station (RBS), which in some networks may be referred to as transmitter, "eNB", "eNodeB", "NodeB" or "B node", depending on the technology and terminology used. The radio network nodes may be of different classes such as, e.g., macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM).

A user device may be any of a User Equipment (UE), mobile station (MS), wireless terminal or mobile terminal which is enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM).

It is generally well accepted in most available channel modeling that the channels vary over different frequencies. As a consequence, it is commonly assumed that UL and DL channels in FDD are uncorrelated. This has resulted in a misconception that the knowledge of UL channel cannot be used for DL transmission since the channels are uncorrelated. It has been realized by the inventors that the channels at different frequencies may have still contain common parameters, which can be used for DL transmission. Some properties of the radio channels will remain unchanged when the frequency band of the transmission is changed. We refer to these parameters as frequency-resilient channel parameters in this disclosure. These parameters include for example the so-called long-term channel statistics. In state-of-the-art, longer-term channel attenuations change slowly with frequency so that for standard frequency spacing, uplink and downlink channels exhibit spatial correlation reciprocity. In this light of thinking, a cascade precoder is designed such that the outer precoder is configured using a feedback link on DL channel estimation at the UE.

A common modeling for the physical propagation channel is to consider a double-directional impulse response being the sum of multiple discrete multi-path components $$h(\tau, \psi, \theta) = \sum_{l=1}^{L} \alpha_l e^{i\phi_l} \delta(\tau - \tau_l) \delta(\theta - \theta_l) \delta(\psi - \psi_l) \quad (1)$$

where $a_e^{i\Phi_l}$ is the complex attenuation, and $\theta_l$, $\psi_l$ the angle of departure and arrival of the lth path.

An omni-directional receive antenna and a uniform linear array (ULA) at the transmitter side of the first communication device 100 is assumed, then the non-directional channel response, i.e. angle-integrated directional channel response for the mth transmit antenna is $$h_m(\tau) = \sum_{l=1}^{L} \alpha_l e^{i\phi_l} \delta(\tau - \tau_{l,m}), \text{ where } \tau_{l,m} = \tau_l + (m-1)\frac{d}{c}\sin\theta_l$$

and $\tau_l$ is the delay of the first (reference) antenna, d is the antenna spacing and c denotes the speed of light.

After Fourier transform, the frequency impulse response of the channel is $$h_m(f) = \sum_{l=1}^{L} \alpha_l(f) e^{i\phi_l} e^{i2\pi\left(\tau_l + (m-1)\frac{d}{c}\sin\theta_l\right)f} \quad (2)$$

It should be accounted that the path attenuation including distance-dependent and frequency dependent path loss is also a function of the frequency.

Finally, the MIMO channel modeled in frequency can be written as
where $$h(f) = \sum_{l=1}^{L} \alpha_l(f) e^{i\phi_l + i2\pi\tau_l f} \begin{bmatrix} 1 \\ e^{i2\pi\frac{d}{c}\sin\theta_l \times f} \\ \vdots \\ e^{i2\pi(n_t-1)\frac{d}{c}\sin\theta_l \times f} \end{bmatrix} \quad (3)$$

h denotes the channel vector for the MIMO transmitter (i.e. first communication device 100) with $n_t$ antenna elements;
f is the signal frequency;
L denotes the number of resolvable paths from the receiver (i.e. second communication device 300) to the antenna array which could be a small number for millimeter waves;
d denotes the antenna spacing at the transmitter;
c denotes the speed of light;
$\alpha_l$ denotes the strength of path l from the receiver to the antenna array of the transmitter which contains, path-loss, small-scale fading and large-scale fading coefficients;
$\theta_l$ denotes the azimuth angle of path l from the receiver to the antenna array;

$\tau_l$ the delay for the lth path from the first antenna of the antenna array;

$\phi_l$ the attenuation phase of the lth path which depends of the number of wavelengths travelled along the path. This parameter is often considered highly random and uncorrelated among the paths.

The correlation between antenna m and n is $$\mathbb{E}[h_m(f)h_n^*(f)] = \mathbb{E}\left(\sum_{k=1}^{L}\sum_{l=1}^{L}\alpha_k(f)\alpha_l^*(f)e^{i(\phi_l-\phi_k)}e^{-i2\pi f(\tau_l-\tau_k)}\right. \quad (4)$$
$$\left. e^{-i2\pi\frac{d}{c}f(m\sin\theta_l - n\sin\theta_k)}\right)$$
$$= \sum_{l=1}^{L}\mathbb{E}|\alpha_l(f)|^2 e^{-i2\pi\frac{d}{c}f(m-n)\sin\theta_l}$$

As such the transmit correlation matrix of the channel is given by $$R(f) = \mathbb{E}[h(f)h^H(f)] = \sum_{l=1}^{L}\mathbb{E}|\alpha_l(f)|^2 a(\theta_l, f)a^H(\theta_l, f) \quad (5)$$

where $$a(\theta_l, f) = \begin{bmatrix} 1 \\ e^{i2\pi\frac{d}{c}\sin\theta \times f} \\ \vdots \\ e^{i2\pi(n_t-1)\frac{d}{c}\sin\theta \times f} \end{bmatrix} \quad (6)$$

In the model above, the angle-of-departure of the transmitted signal is a frequency-resilient parameter. While the attenuation $\mathbb{E}|\alpha_l(f)|^2$ is frequency-dependent, the relative attenuation among the L paths can be well-modeled as frequency-resilient.

The channel attenuation is mostly constituted of distant-dependent path loss, which is given as $$\mathbb{E}|\alpha_l(f)|^2 \propto \left[\frac{\sqrt{G}c}{4\pi df}\right]^{m(f)} \quad (7)$$

where G is the antenna gain, and m(f) is the path loss exponent.

For example, for a LOS path, the free-space path loss is m(f)=2. For non-LOS, values ranging from 2 to 6.5 have been reported. As a general trend, the path-loss exponent increases with carrier frequency. Examples of reported values include an increase from 3.3 to 4.5 when frequency increases from 2.4 GHz to 11.5 GHz.

One remarks that in a paired spectrum allocation, UL and DL bands are often in relative near vicinity. In LTE, the duplex spacing (DS) ranges from 30 MHz to 400 MHz, and almost all bands have a duplex spacing of less than 100 MHz. For this spacing, the path-loss exponent can also be considered frequency-resilient.

In the case of the first band of LTE (DS: 190 MHz, DL: 2140 MHz, UL: 1950 MHz), the path loss of the DL is 0.83 times the path-loss of the UL at LOS, and 0.81 at m(f)=2.2.

In the case of the second band (DS: 80 MHz, DL:1960 MHz, UL: 1880 MHz), the path loss of the DL is 0.92 the path-loss of the uplink in LOS, and 0.91 with m(f)=2.2. In many band allocations, it is thus possible to find a good estimate of the DL correlation matrix from the UL correlation matrix.

We highlight that the above physical modeling coincides with i.i.d. Rayleigh fading which is widely used if the number of reflection are high (which follows by the central limit theorem):

$$\mathbb{E}[h_m(f)h_n^*(f)] \to 0 \text{ for } d \text{ large enough}\left(d > \frac{d}{2f}\right) \text{ and } L \to \infty.$$

However, there are scenarios for which the number of reflections is limited. In particular, for millimeter wave communications in some frequency band the most dominant path is the line-of-sight (LoS) link. In the above model, only the angles of arrivals are considered since we considered an ideal omnidirectional antenna pattern at the receiver.

Extensions of the present solution to other types of arrays for example cylindrical or any other geometrical shape which might be selected due to preferences, such as design and performances, does not deviate from the spirit of the present disclosed solution. When a UE transmits UL signal to a massive array the transmitted signal propagates on multiple paths. The change of frequency has the following effects:

The path loss component, the larger the frequency the higher the path loss. This change is slow.

The small-scale fading becomes generally independent over different frequencies. This arises by the inherent combining of the path over the random angles $\phi_l$.

However, the large-scale shadow fading does not change.

The angles do not change, however their spread statistically changes.

Figure 3:
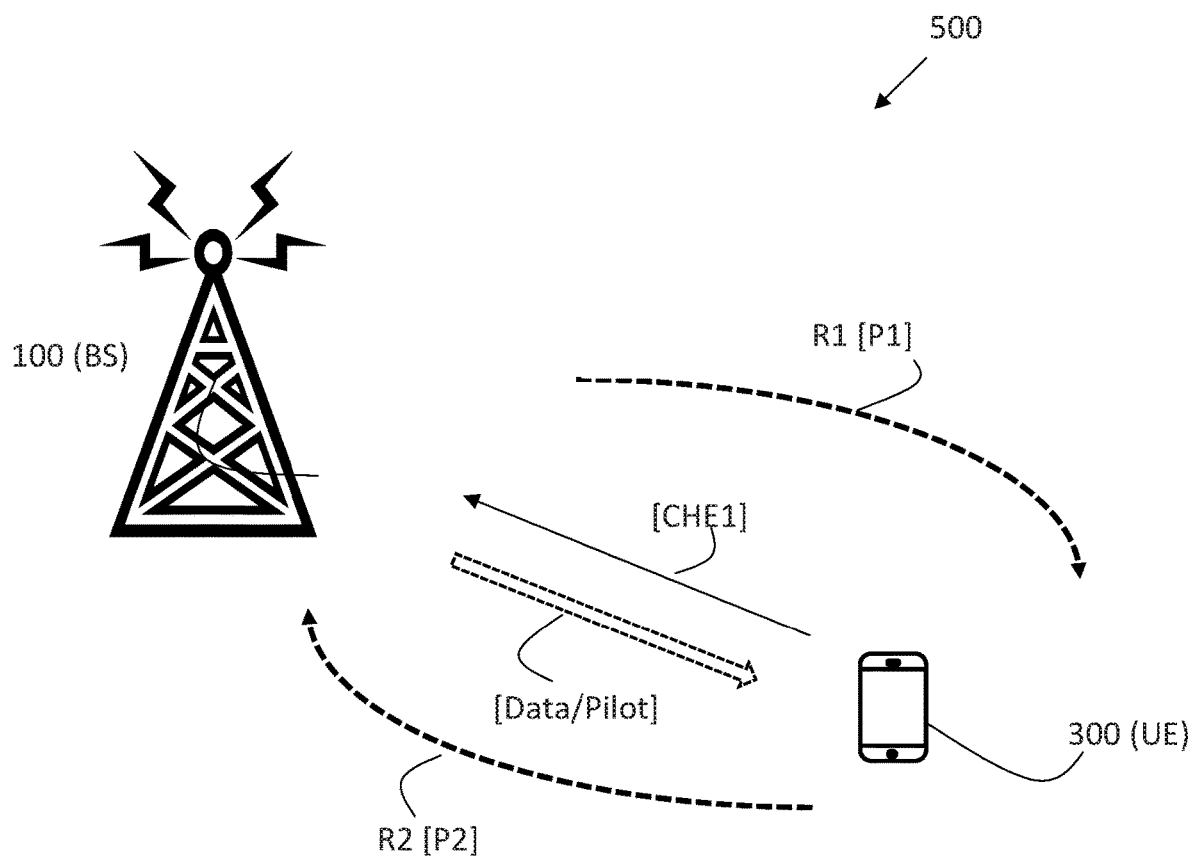
FIG. 3 shows a wireless communication system according to an embodiment of the disclosure.

FIG. 3 shows a wireless communication system 500 according to a further embodiment of the disclosure. The wireless communication system 500 comprises at least one first communication device 100 which in this particular example is a base station (BS) and at least one second communication device 300 which in this particular example is a user equipment (UE). In FIG. 3 it is illustrated that the BS transmits DL pilots P1 (i.e. first pilot sequence) to the UE in a first radio channel R1 which is the channel from the BS to the UE, or correspondingly from the first communication device 100 to the second communication device 300. The UE estimates the first radio channel R1 and transmits a first channel estimate CHE1 to the BS. The first channel estimate CHE1 is therefore associated with the first radio channel R1. Based on the received first channel estimate CHE1 the BS determines the outer precoder 106. Finally, the BS transmits at least one of a data sequence and a pilot sequence to the UE. In one embodiment of the disclosure, the at least one data sequence and pilot sequence is precoded with the determined outer precoder 106 and the determined inner precoder 108 by the processor 102.

FIG. 3 also illustrates the embodiment when the UE transmits data and/or UL pilots P2 (i.e., second pilot sequence) to the BS. Based on the received data and/or UL pilots P2 the BS computes a second channel estimate CHE2 associated with a second radio channel R2 from the UE to the BS, or correspondingly from the second communication device 300 to the first communication device 100. The BS uses the second channel estimate CHE2 for determining the inner precoder 108 according to this embodiment.

It has also been realized by the inventors that the relationship between the first radio channel R1 and the second radio channel R2 can be used in the present precoding solution. Accordingly, the processor 102 of the first communication device 100 is configured to compute the correlation matrix for the second radio channel R2 based on the second channel estimation CHE2 and to determine the inner precoder 108 based on the correlation matrix for the second radio channel R2. Furthermore, the processor 102 of the first communication device 100 is configured to compute the correlation matrix for the first radio channel R1 based on the correlation matrix for the second radio channel R2, and to determine the inner precoder 108 based on the correlation matrix for the first radio channel R1.

Figure 4:
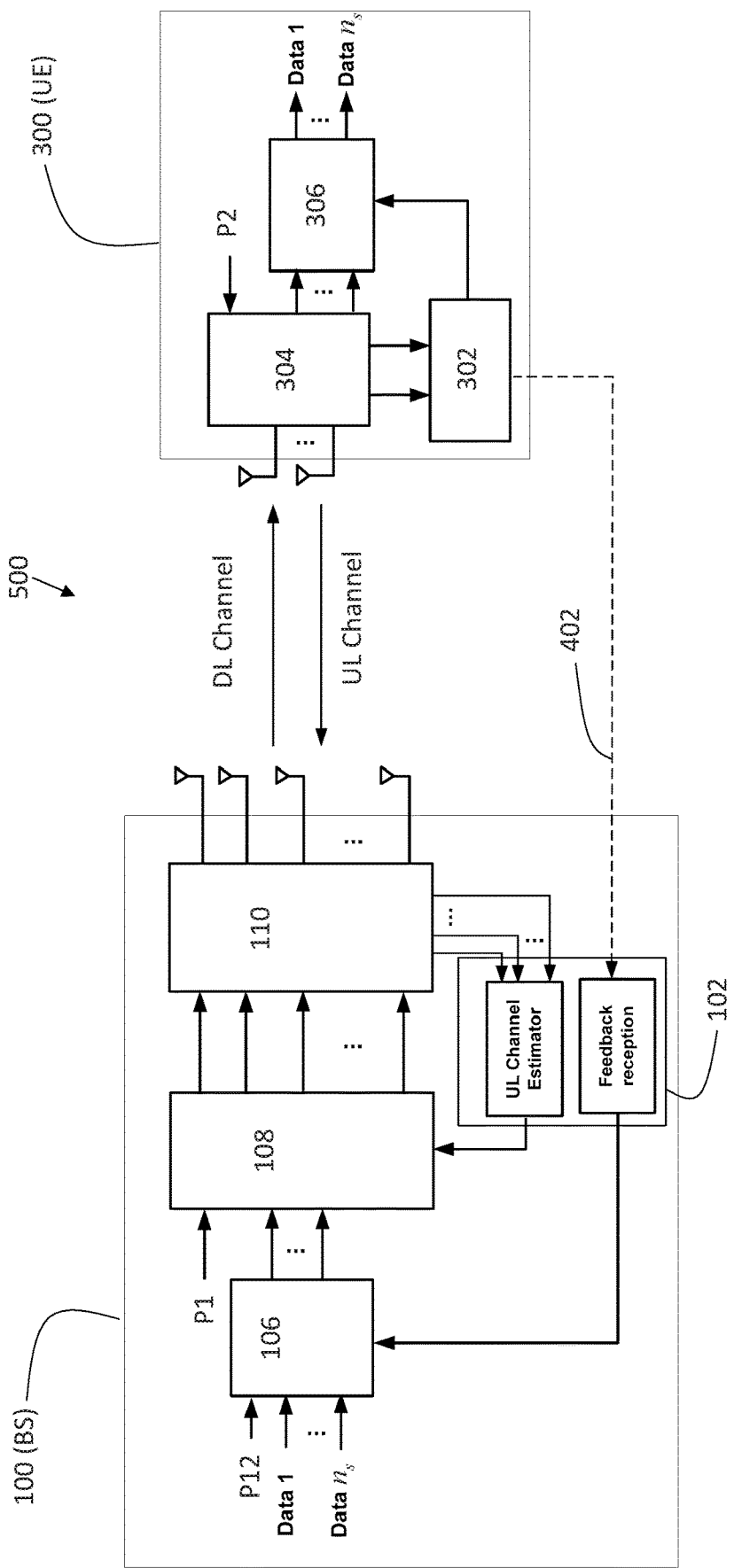
FIGS. 4-6 show further embodiments of the disclosure.
Figure 5:
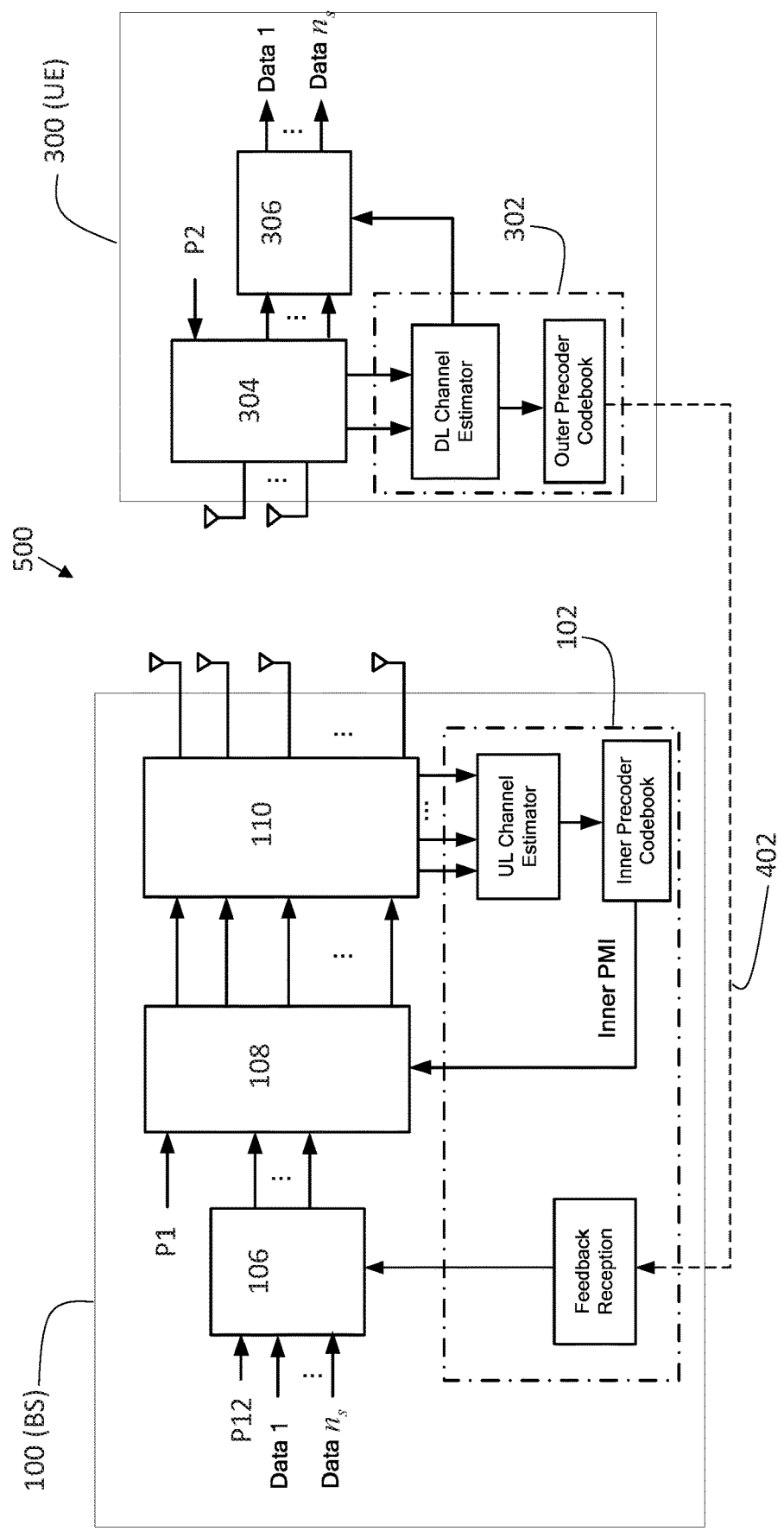
Figure 6:
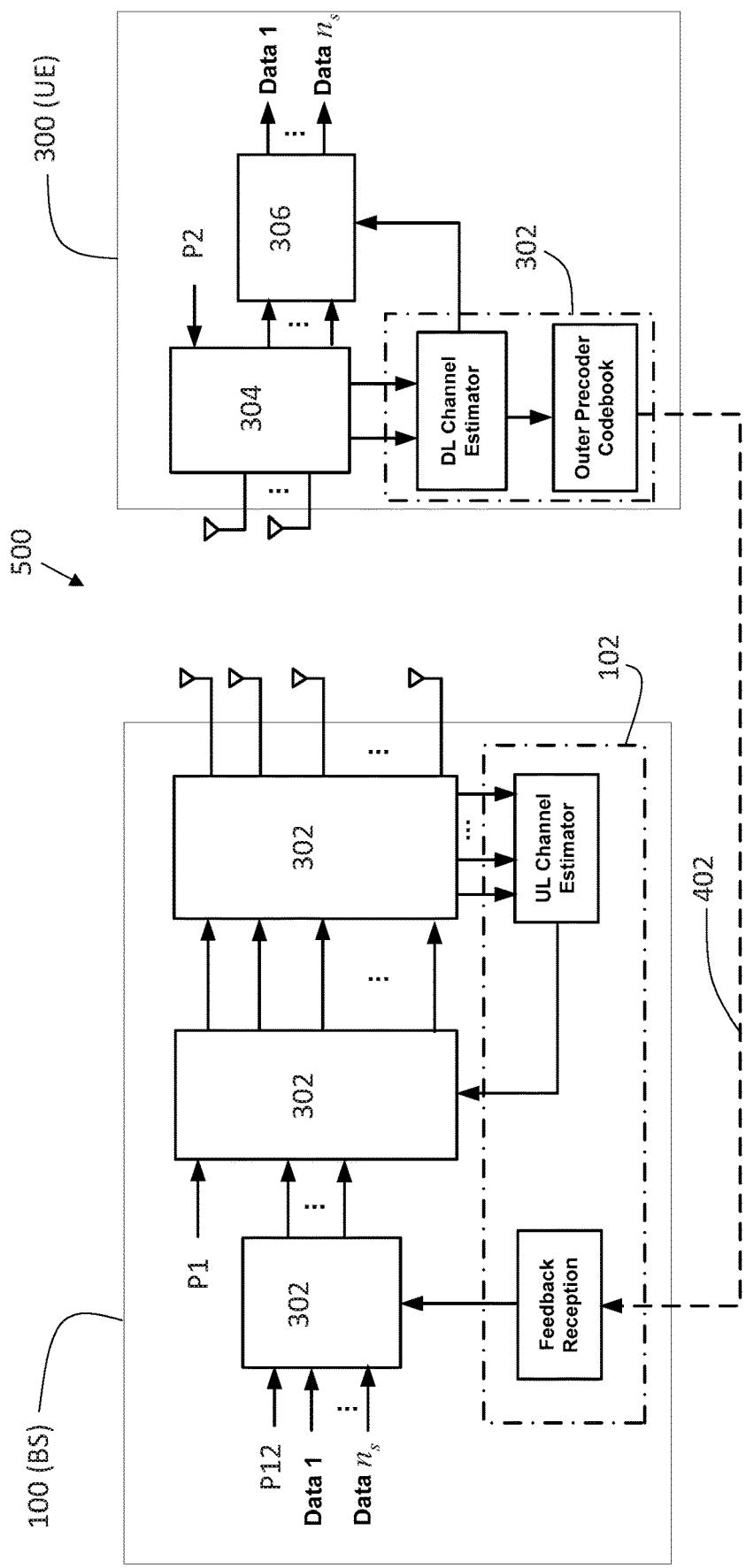

FIG. 4, shows an embodiment of the present solution. The first communication device 100 is also in this example a BS and the second communication device 300 is a UE. The inner precoder 108 is found by using UL training pilot sequences (second pilot sequence P2) transmitted in the UL channel which eliminates the need of excessive pilot overhead, since for UL, the number of pilot sequences is proportional to the number of antennas at the UE which is normally limited. This also removes the need of feedback from the UE for determining the inner precoder 108. The inner precoder 108 may exploit spatial correlation structure to compress the channel into an effective channel of lower dimensionality. However, there is no full reciprocity between UL and DL channels in FDD on short-term channel realization. The outer precoder 106, is designed to be determined by using feedback from the UE (via a feedback channel 402), but since the dimension of the outer precoder 106 can be reduced thanks to the inner precoder 108, the pilot overhead and the feedback remains as in the classical MIMO systems and hence the proposed design lend itself to a scalable design for mMIMO systems. The outer precoder 106 also makes the wireless communication system 500 more robust toward a potential mismatch which may occur by the UL based determined inner precoder 108 because the outer precoder 106 is configured based on the DL effective channel whose dimension is reduced by the help of the inner precoder 108. The BS receives data and/or pilots for DL transmissions, precodes the received data and/or pilots according to the present solution using the outer precoder 106, inner precoder 108, and the processor 102, and transmits the precoded data and/or pilots using the transceiver 110. It is also illustrated in FIG. 4 that the processor 102 comprises a UL channel estimation module and a feedback reception module. In FIGS. 4-6 the feedback channel 402 points directly on the processor 102 for illustrative purpose. However, the feedback from the UE may be received via the transceiver 110 or any other communication receiving means of the BS.

In FIG. 4 the UE receives two types of pilot sequences using its transceiver 304 and performs channel estimation using its processor 302. The pilot sequences P1 which is only precoded by the inner precoder 108 is transmitted from the BS to assist the UE to estimate the equivalent inner-precoded channel, i.e. first channel estimation CHE1, to provide feedback to the BS. The first channel estimation CHE1 is transmitted via feedback channel 402, in order to configure the outer precoder 106 at the BS. The pilot sequences P12 is precoded by both the outer 106 and inner 108 precoders of the BS to assist the UE to estimate the equivalent inner-outer-precoded channel in order to demodulate the data sequences using the demodulator and decoding block 306. The UE in general might be agnostic to the choice of the inner and outer precoders at the BS, and hence it becomes necessary to transmits the pilot sequences P12 for data demodulation and detection. Moreover, FIG. 4 shows the embodiment in which the UE transmits UL pilots (i.e., P2) in the UL channel to the BS which is used for configuration of the inner precoder 108 at the BS.

The cascade precoder 104 shown in FIG. 4 can be implemented in several ways. Two particular embodiments are illustrated in FIGS. 5 and 6, respectively.

FIG. 5 depicts a digital implementation of the cascade precoder 104 in FIG. 4 where the channel estimates are used with digital precoder codebooks to decide for a precoder matrix index (PMI). The PMI for the outer precoder 106 is found using the inner-precoded DL channel estimation (i.e. CHE1) and the knowledge of a digital outer precoding codebook known at both BS and UE. The UE, based on the channel estimation and by using the inner-precoded first pilot sequence P1, selects a PMI to be fed back to the BS. Therefore, the processor 302 of the UE comprises an inner-precoded DL channel estimation module and an outer precoder codebook in this embodiment. The processor 102 of the BS, based on the received PMI feedback, configures the digital outer precoder. However, the digital inner precoder is configured using the PMI for the inner precoder 108 which is found using the UL channel estimates (i.e. CHE2) and a digital inner-codebook. The processor 102 in FIG. 5 comprises a UL channel estimation module, a feedback reception module and an inner precoder codebook.

FIG. 6 depicts a hybrid digital-analog implementation of the cascade precoder 104 in FIG. 4. The PMI for the outer precoder 106 is found using the DL channel estimation (i.e. CHE1) and the knowledge of a digital outer precoding codebook known at both BS and UE. The UE, based on the channel estimation and by using the inner-precoded first pilot sequence P1, selects a PMI to be fed back to the BS. Therefore, the processor 302 of the UE comprises a DL channel estimation module and an outer precoder codebook in this embodiment. The processor 102 of the BS, based on the received PMI feedback, configures the digital outer precoder. However, the analog inner precoder 108 is found using the UL channel estimates (i.e. CHE2). The processor in FIG. 6 comprises a UL channel estimation module and a feedback reception module.

Figure 7:
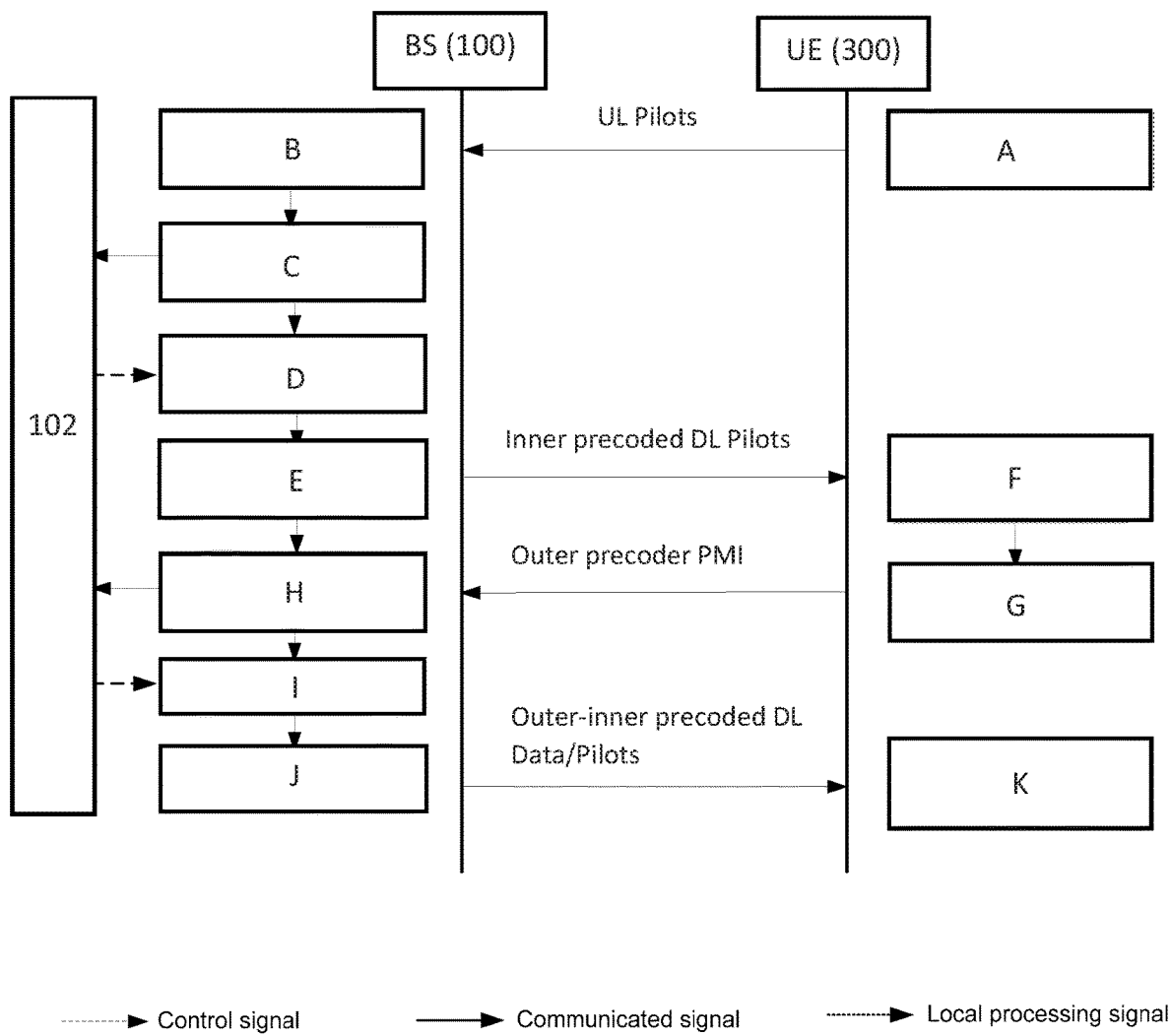
FIG. 7 shows signaling and configuration aspects of embodiments of the disclosure.

FIG. 7 shows a further embodiment of the disclosure in which configuration of precoders and signaling aspects are highlighted. The UE 300 transmits UL pilots at A which are received by the BS 100 at B and based on the received UL pilots the processor 102 of the BS estimates the UL channel at C. The processor 102 also determines the inner precoder 108 at D, and DL pilots precoded with the determined inner precoder 108 is transmitted to the UE at E. The UE estimates the DL channel based on the received DL pilots at F. The UE further determines the PMI for the outer precoder 106 based on the inner-precoded DL channel estimation. The PMI is transmitted to the BS at G which receives the PMI at H and chooses the outer precoder 106 according to the received PMI at I. Finally, the BS transmits data, or pilots, or data and pilots to the UE at J which are precoded with the configured outer precoder 106 and inner precoder 108. The UE receives the transmitted data, or pilots, or data and pilots at K to estimate the equivalent outer-inner-precoded DL channel and to demodulate and detect the received data.

Figure 8:
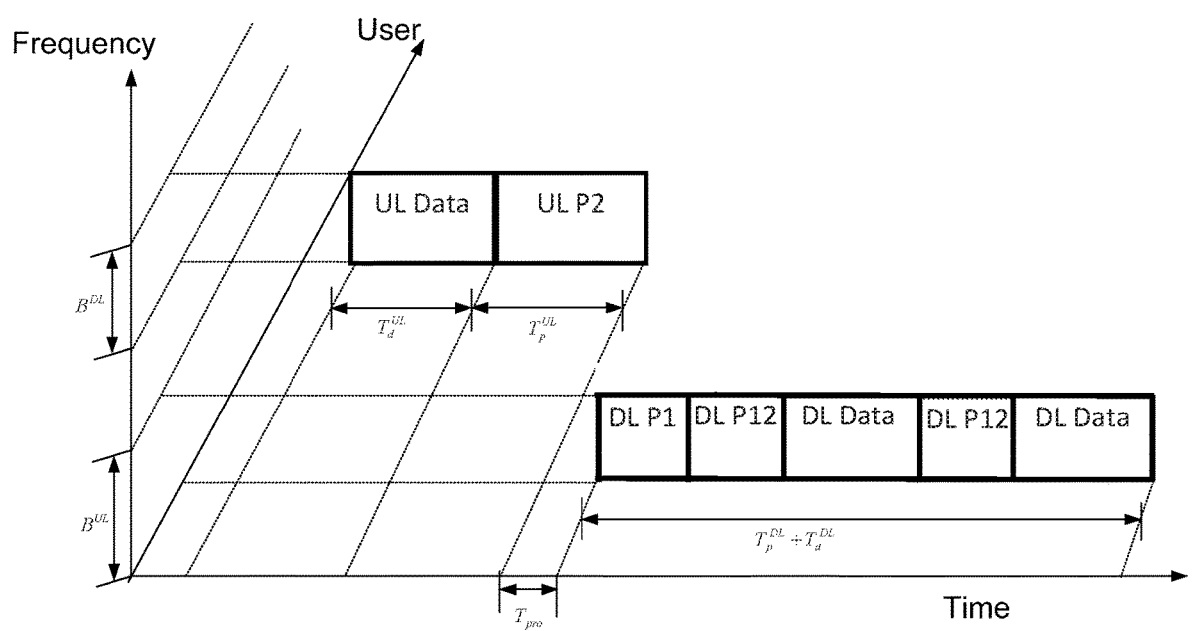
FIG. 8 shows an exemplary transmission frame structure.

FIG. 8 shows the transmission frame structure for the proposed solution in which the UL and DL transmissions are configured in FDD mode. The x-axis shows time and the y-axis shows the frequency. In this example, multiple of users, such as UEs, are configured for UL and DL transmissions. Uplink pilot sequences are used for channel estimation which could be used for decoding of UL data. We additionally, use the UL pilot for channel decomposition such that frequency-resilient parameters can be extracted. These parameters are then used to find the precoding matrices that are used for DL transmission. The time for the channel estimation and parameter extraction is denoted by $T_{pro}$, after which the DL transmission may begin. To enable, the UEs to estimate the precoded DL channels, DL pilot symbols are multiplexed with precoded DL data. Each transmission shown in FIG. 8 may comprise one or more resource elements (REs).

In the context of transmit and receive baseband signals, the DL transmission equation may be assumed to be $$y = HWx + z \quad (8)$$

where
H denotes the MIMO channel which is $n_r \times n_t$ matrix, modelled as $H = \tilde{H} R_{DL}^{1/2}$ where $\tilde{H}$ is a matrix with complex Gaussian entries and $R_{DL}$ is the antenna array spatial correlation and n is the number antennas at the receiver.
W denotes the downlink precoder matrix which has a cascaded structure, i.e. $W = W_i W_o$, where
$W_o$ denotes the outer precoder which is a $n_b \times n_s$ matrix parameterized and selected according to the uplink sounding where $n_b$ is the number of output streams at the outer precoder (i.e. number of streams to the inner precoder) and $n_s$ is the number of streams.
$W_i$ denotes the inner precoder which is an $n_t \times n_b$ matrix parameterized and selected from downlink sounding and feedback.
x denotes the modulated signal vector prior to the precoding.
z denotes the AWGN vector at the receiver.

An important feature of the present solution is the design parameter $n_b$ which could be selected such that $n_b \geq n_r$ in order to facilitate DL pilot and feedback reduction. The design parameter $n_b$, can be reduced to the number of data streams. In other words, the number of output streams $n_b$ of the outer precoder 106 is less than the number of transmit antennas $n_t$ of the first communication device 100. In this way the size of equivalent inner-precoded MIMO channel will be notably reduced and it in turn enables low pilot overhead transmission as well as low feedback overhead.

The UE is assigned a pilot sequence, $x_p^{UL}$ to be transmitted from the UL channel. The uplink pilot sequences, which also are denoted as second pilot sequences P2, should be allocated in time close to the DL data to ensure that the frequency-resilient channel parameters do not change notably. In multi-user case it is beneficial to let the UL pilot sequence be mutually orthogonal when the pilot sequences are mapped to the same time-frequency resource in order to avoid pilot contamination. The UL pilot sequences can be transmitted using Time-Division multiplexing (TDM), Frequency-Division Multiplexing (FDM), Code-Division Multiplexing (CDM) or any combination of these methods. This step is optional as the inner precoder 108 might be configured without dedicated uplink pilot sequences as described above.

The BS estimates the UL spatial correlation $R_{UL}$ from the UL pilot sequences. Long-term statistics parameters can be estimated within a coherence time using the UL pilot sequences which are transmitted in different frequencies. For example, for linear array when the channel has one dominant single path to the array, the BS can easily estimate the inclination (or elevation) angle for which the problem reduces to classical parameter estimation.

The BS constructs an estimate $\hat{R}_{DL}$ of the spatial correlation matrix of the DL channel. The BS can either use the full UL spatial correlation matrix $R_{UL}$ or only specific frequency-resilient parameters. For example, for channel exhibiting a single strong dominant path to the array, the BS may use only AoD estimation from $R_{UL}$ to construct $\hat{R}_{DL}$. One may also apply correction of based frequency different between the UL and DL frequency carriers.

Another embodiment is to use a DFT-based codebook, which is known to provide a good approximation of the eigenvectors of Uniform Linear Array (ULA) correlation matrix. This approach is in line with the virtual channel parameterization of the channel. It has also been shown that the eigenvectors of the correlation matrix of ULA are actually asymptotically equal to DFT vectors when $n_t \to \infty$.

The BS then precodes the encoded and modulated symbols. The rates, R, and modulation orders, M, as well as the precoding matrix, $W_i$, are instructed by the processor 102 which also may be seen as a controller.

In one embodiment, the inner precoding matrix for the inner precoder 108 is found using a predetermined digital codebook wherein the inner codebook is denoted by $C_i = \{C_{i,1}, \ldots, C_{i,n}\}$, the inner precoder matrix is selected as $$W_i = \arg\max_{C_k \in C_i} f(H_{UL}, C_k)$$

where f(.) is a metric function which maps the uplink channels to be used for inner-precoder selection. Examples of metric functions include but are not limited to capacity, SNR, SINR, matrix correlation, and inverse distance.

In another embodiment, the precoding matrix $W_i$ in its generic form is selected from $\hat{R}_{DL}$. A key feature is that the precoding matrix $W_i$ offers a dimensional reduction of the equivalent channel for selection of outer precoder 106 with much less overhead.

In yet another embodiment W approximates $\hat{R}_{DL}$ by $n_b \leq n_t$ of its dominant eigenvectors. Given the estimate of $\hat{R}_{DL} = \text{Conv}(R_{UL})$ obtained from the conversion of the UL correlation matrix $R_{UL}$, its singular value decomposition (SVD) gives $\hat{R}_{DL} = USU^H$ where $U = [u_1, \ldots, u_{n_t}]$. The processor 102 may configure the inner precoder 108 as $$W_i = [u_1, \ldots, u_{n_b}] \quad (9)$$

with $n_b \leq n_t$. That is the first $n_b$ columns of U are selected to form the inner precoder 108 in this particular example.

In another embodiment, the BS may construct the correlation matrix by finding at least one of the arrival inclination (a.k.a. elevation) or/and azimuth angles and then configure the inner precoder 108 using the SVD operation as described above.

In yet another embodiment, the parameters are the inclination and azimuth angles and the precoding becomes angular precoding. The processor 102 has access to a set of precoding matrices parameterized with the estimated angles. The processor 102 forms the following a selection of beams $$W_i = [\hat{w}_1 \ldots \hat{w}_{n_b}] \quad (10)$$

where $$\hat{w}_k = \begin{bmatrix} 1 \\ e^{i2\pi d \sin\hat{\theta}_k \times f_{DL}} \\ \vdots \\ e^{i2\pi(n_t-1)d \sin\hat{\theta}_k \times f_{DL}} \end{bmatrix} \quad (11)$$

with $f_{DL}$ the downlink carrier frequency, and $\hat{\theta}_k$ the estimated DL AoD from the UL AoA. The mapping in Eq. (11) can be extended to the cases with both inclination (a.k.a. elevation) or/and azimuth angles.

The inner precoded channel for the UE then can be trained using the conventional pilot transmission since the number of pilot sequences for channel estimation scales with the number of data streams. The pilot sequences can be transmitted for example as similar to those in LTE systems via which the inner precoder channel are estimated. The precoded DL pilot sequences $W_i x_{pi}^{DL}$ can be transmitted using Time-Division multiplexing (TDM), Frequency-Division Multiplexing (FDM), Code-Division Multiplexing (CDM) or any combination of these methods. The proposed solution significantly reduces the effort of channel training and feedback thanks to the configuration of the inner precoder 108.

Having estimated the equivalent inner precoded channel, the UE sends information on the feedback link to enable the processor 102 of BS to configure the outer-precoder, i.e. $W_o$. The feedback information can be the PMI which is based on a precoding codebook known both at the transmitter side and the receiver side as well as the RI which denotes the number of scheduled data streams. Since the number of data streams for the outer precoder is limited, the number of required feedback bits can be kept similar as those of the conventional MIMO systems.

Then the UE estimates the effective channel $H_{eff} = H W_i$ from DL pilot transmission and feds back feedback information to the BS to configure the outer precoder, i.e. $W_o(f(H W_i))$ where $f(.)$ denotes a mapping. A solution is to use the codebook-based strategy. Given a codebook $C = \{C_1, \ldots, C_{n_{cb}}\}$, where $n_{cb}$ is the number of codewords, a common SVD selection is given by $$W_o = \underset{C_k \in C}{\arg\max} \|V_{eff}^H C_k\|_F \quad (12)$$

where $V_{eff} \in \mathbb{C}^{n_b \times n_s}$ round using the SVD of the effective channel $H_{eff}$ as its $n_s$-dominant right singular vectors.

Another lower-complexity selection can be done by maximizing the receive power such that $$W_o = \underset{C_k \in C}{\arg\max} \|H_{eff} C_k\|_F \quad (13)$$

This solution does not require SVD operation. One may also use analog feedback since the dimensions of the equivalent channels are low.

When both the outer precoder 106 and inner precoder 108 are configured by the BS, the equivalent downlink channel of the UE, i.e. $HW_i W_o$, can be estimated by transmitting some additional precoded pilot sequences $W_i W_o x_{p2}^{DL}$ along with the data sequences.

Having estimated the precoded channel, the decoder of the UE performs decoding. The decoding is successful if the selected rate by the controller (or scheduler) satisfies $$R < \frac{N - T_p^{DL}}{N} \log\det\left(I + \frac{1}{N_o} W_o^H W_i^H H^H H W_i W_o\right) \quad (14)$$

where it is assumed that the channel coherence block is $N = T_c B_c$ and $T_p^{DL}$ is time that the BS transmits precoded pilot sequences for configuration of the outer precoder for both DL pilot 1 and DL pilot 2 in FIG. 8.

Figure 9:
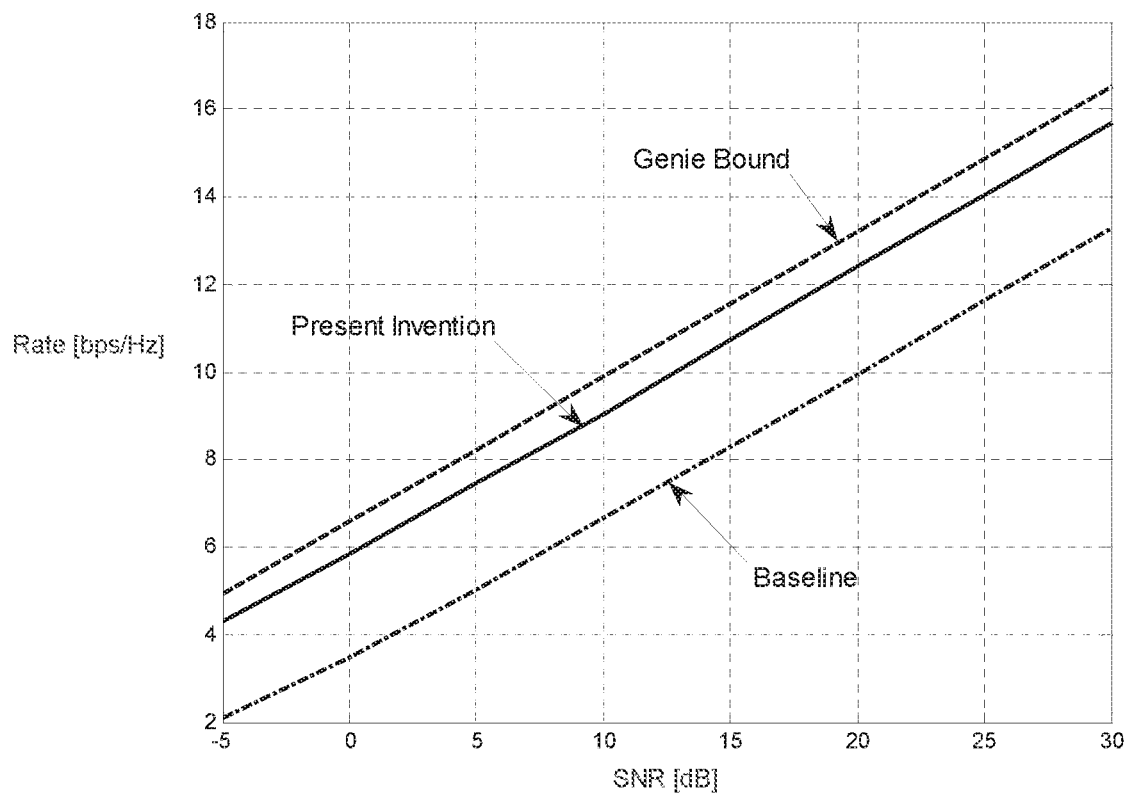
FIGS. 9-10 show performance results.
Figure 10:
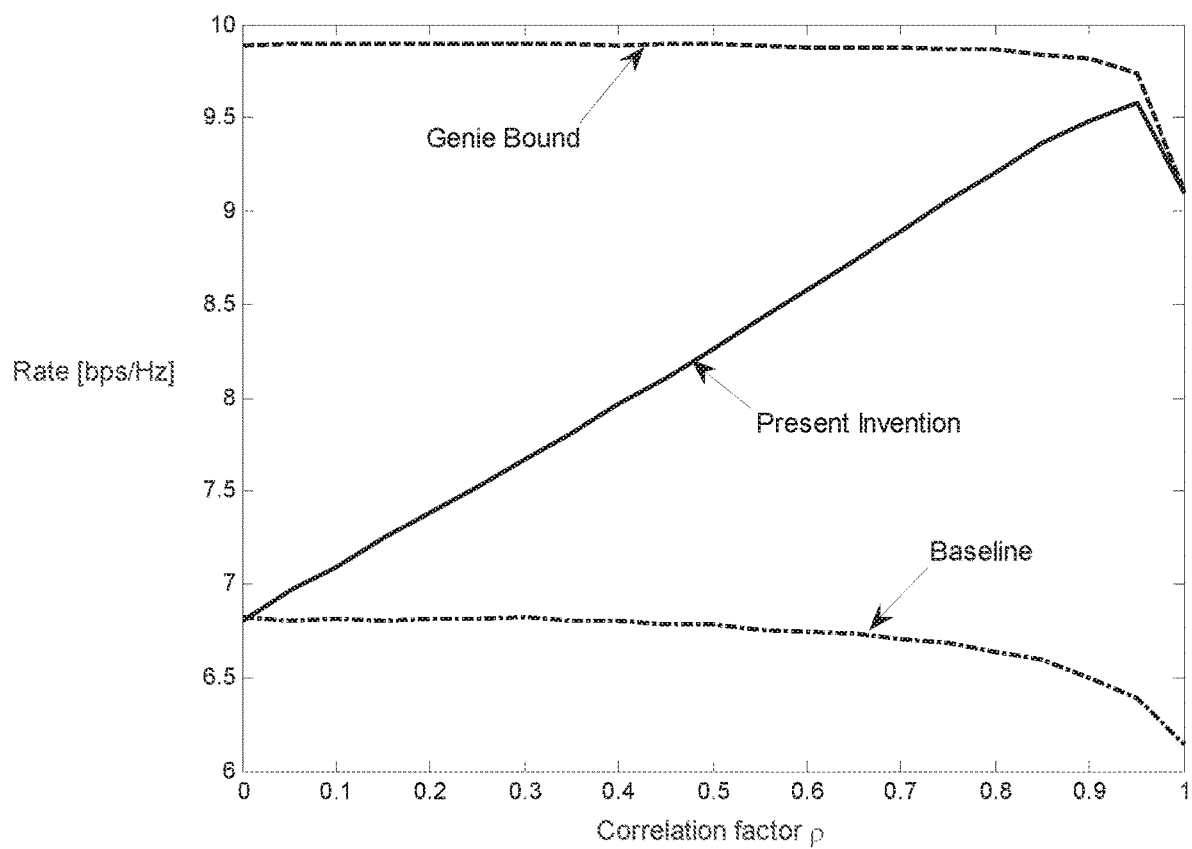

The achievable rate with perfect CSI is compared for three different schemes in FIGS. 9 and 10. In FIG. 9 the x-axis shows the SNR and the y-axis the rate in bps/Hz. FIG. 9 shows the achievable rates for $\rho = 0.8$. In FIG. 10 the x-axis shows the correlation factor $\rho$ for SNR=10 dB and the y-axis shows the rate in bps/Hz.

Three different solutions are considered in FIG. 10, namely:

The present solution: we consider single-antenna UE with mMIMO with 64 Tx antenna where the received signal at the UE is modelled to be $y = hwx + n$, where $h = \tilde{h} R^{1/2}$ with $\tilde{h}$ being a 1×64 complex Gaussian vector and R is a 64×64 correlation matrix following an exponential model, i.e. $[R]_{m,n} = \rho^{|m-n|} \exp(i(m-n)\theta)$. The precoder is a cascade precoder $w = W_i w_o$. The inner precoder $W_i$ is 64×8 matrix formed of 8 correlation beams as the 8 largest eigenvectors of R. Then the outer precoder $w_o$ is the optimum MRT of the effective channel, $w_{eff} = h_{eff}^H/\|h_{eff}\|$, where $h_{eff} = h W_i$.

Baseline solution: we consider a reference 8×1 MIMO system using a Maximum Ratio Transmission (MRT) precoder given as $w = h^H/\|h\|$. This system has the same amount of DL pilot signaling and feedback as that in the proposed solution.

Genie Bound: for comparison we also consider, a full 64×1 mMIMO system using also an ideal MRT precoder with full CSI. Such mMIMO system with full CSI would be impractical in FDD, but we however consider that as an upper bound.

For the classical baseline MIMO solution, the rate is slowly decreasing with spatial correlation. An interesting aspect of the present solution is that its capacity is increasing with correlation until being close to maximum correlation where it starts to drop. This figure advocates the usage of highly correlated array for FDD mMIMO for the single user case.

Furthermore, any methods according to embodiments of the disclosure may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the first communication device 100 comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present first communication device 100 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

What is claimed is:

1. A first communication device for a wireless communication system, the first communication device comprising:
   a processor;
   a cascade precoder including an outer precoder and an inner precoder; and
   a transceiver;
   wherein the processor is configured to determine the inner precoder among precoders of the cascade precoder;
   wherein the transceiver is configured to transmit a first pilot sequence to a second communication device, the first pilot sequence being precoded with the inner precoder determined by the processor;
   wherein the transceiver is configured to receive a first channel estimation from the second communication device in response to transmitting the first pilot sequence to the second communication device, wherein the first channel estimation is associated with a first radio channel from the first communication device to the second communication device;
   wherein the processor is configured to determine the outer precoder based on the first channel estimation;
   wherein the transceiver is configured to transmit at least one of a data sequence and a pilot sequence to the second communication device;
   wherein the transceiver is configured to receive at least one of a second data sequence and a second pilot sequence from the second communication device;
   wherein the processor is configured to compute a second channel estimation associated with a second radio channel from the second communication device to the first communication device based on the at least one of the second data sequence and the second pilot sequence; and
   wherein the processor is configured to determine the inner precoder based on the second channel estimation.

2. The first communication device according to claim 1, wherein the at least one of the data sequence and the pilot sequence is precoded with the outer precoder and the inner precoder determined by the processor.

3. The first communication device according to claim 1, wherein the processor is configured to:
   compute a correlation matrix for the second radio channel based on the second channel estimation; and
   determine the inner precoder based on the correlation matrix for the second radio channel.

4. The first communication device according to claim 3, wherein the processor is configured to:
   compute a correlation matrix for the first radio channel based on the correlation matrix for the second radio channel; and
   determine the inner precode based on the correlation matrix for the first radio channel.

5. The first communication device according to claim 4, wherein the processor is configured to:
   perform a Singular Value Decomposition (SVD) of the correlation matrix for the first radio channel; and
   determine the inner precoder based on the SVD.

6. The first communication device according to claim 5, wherein the processor is configured to determine the inner precoder based on a subset of dominant eigenvectors of the SVD.

7. The first communication device according to claim 1, wherein the processor is configured to:
   estimate angles-of-arrivals of the at least one of the second data sequence and the second pilot sequence, to compute a correlation matrix for the first radio channel based on the estimated angles-of-arrivals of the at least one of the second data sequence and the second pilot sequence; and
   determine the inner precoder based on the correlation matrix for the first radio channel.

8. The first communication device according to claim 1, wherein the transceiver is configured to receive an outer precoding indicator from the second communication device; and
   wherein the processor is configured to determine the outer precoder according to the outer precoding indicator.

9. The first communication device according to claim 8, wherein the outer precoding indicator is a Precoding Matrix Index (PMI) or a Rank Indication (RI).

10. The first communication device according to claim 1, wherein a number of output streams of the outer precoder is less than a number of transmit antennas of the first communication device.

11. The first communication device according to claim 1, wherein the processor is configured to determine the inner precoder from Discrete Fourier Transform (DFT) codebooks.

12. A method for a first communication device comprising a cascade precoder including an outer precoder and an inner precoder, the method comprising:
   determining the inner precoder among precoders of the cascade precoder;
   transmitting a first pilot sequence to a second communication device, the first pilot sequence being precoded with the inner precoder;
   receiving a first channel estimation from the second communication device in response to transmitting the first pilot sequence to the second communication device, wherein the first channel estimation is associated with a first radio channel from the first communication device to the second communication device;
   determining the outer precoder based on the first channel estimation;
   transmitting at least one of a data sequence and a pilot sequence to the second communication device;
   receiving at least one of a second data sequence and a second pilot sequence from the second communication device;
   computing a second channel estimation associated with a second radio channel from the second communication device to the first communication device based on the at least one of the second data sequence and the second pilot sequence; and
   determining the inner precoder based on the second channel estimation.

13. The method according to claim 12, wherein the at least one of the data sequence and the pilot sequence is precoded with the outer precoder and the inner precoder determined by the processor.

14. The method according to claim 12, wherein the first channel estimation is associated with a first radio channel from the first communication device to the second communication device.

15. A non-statutory computer readable medium with program code stored thereon that, when executed by a processor, causes a computer to perform the steps of:
   determining an inner precoder among precoders of a cascade precoder;
   transmitting a first pilot sequence to a second communication device, the first pilot sequence being precoded with the inner precoder;
   receiving a first channel estimation from the second communication device in response to transmitting the first pilot sequence to the second communication device, wherein the first channel estimation is associated with a first radio channel from a first communication device to the second communication device;
   determining an outer precoder of the cascade precoder based on the first channel estimation;
   transmitting at least one of a data sequence and a pilot sequence to the second communication device;
   receiving at least one of a second data sequence and a second pilot sequence from the second communication device;
   computing a second channel estimation associated with a second radio channel from the second communication device to the first communication device based on the at least one of the second data sequence and the second pilot sequence; and
   determining the inner precoder based on the second channel estimation.

16. The non-statutory computer readable medium according to claim 15, wherein the at least one of the data sequence and the pilot sequence is precoded with the outer precoder and the inner precoder.

17. The non-statutory computer readable medium according to claim 15, wherein the first channel estimation is associated with a first radio channel from the first communication device to the second communication device.

* * * * *